US012561228B2

(12) United States Patent (10) Patent No.: US 12,561,228 B2
Nanjekye et al. (45) Date of Patent: Feb. 24, 2026

(54) OPTIMAL JUST-IN-TIME TRACE SIZING FOR VIRTUAL MACHINES

(71) Applicant: International Business Machines Corporation, Armonk, NY (US)

(72) Inventors: Joannah Nanjekye, Kampala (UG); David D. Bremner, Fredericton (CA); Aleksandar Micic, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 18/472,061

(22) Filed: Sep. 21, 2023

(65) Prior Publication Data

US 2025/0103466 A1 Mar. 27, 2025

(51) Int. Cl.
G06F 11/362 (2025.01)
G06F 11/3698 (2025.01)

(52) U.S. Cl.
CPC ...... G06F 11/3636 (2013.01); G06F 11/3698 (2025.01)

(58) Field of Classification Search
CPC .......................... G06F 11/3636; G06F 11/3698
USPC ......................................................... 717/128
See application file for complete search history.

(56) References Cited

U.S. PATENT DOCUMENTS

| | | | | | |
|---|---|---|---|---|---|
| 6,065,020 | A * | 5/2000 | Dussud | ............... | G06F 12/0253 |
| 6,470,492 | B2 * | 10/2002 | Bala | .................... | G06F 11/3612 |
| | | | | | 714/E11.212 |
| 7,287,049 | B1 * | 10/2007 | Printezis | ............. | G06F 11/3419 |
| 7,428,560 | B1 * | 9/2008 | Detlefs | ............... | G06F 12/0276 |
| 7,725,885 | B1 * | 5/2010 | Pradhan | .............. | G06F 9/45516 |
| | | | | | 717/148 |
| 8,549,498 | B2 | 10/2013 | Hayashizaki et al. | | |
| 10,929,160 | B1 * | 2/2021 | Mateev | .................. | G06F 8/443 |
| 11,249,881 | B2 | 2/2022 | Myers et al. | | |
| 11,650,801 | B2 * | 5/2023 | Le | ......................... | G06F 8/4434 |
| | | | | | 717/151 |
| 2005/0027761 | A1 * | 2/2005 | Wu | ...................... | G06F 12/0261 |
| 2007/0203960 | A1 * | 8/2007 | Guo | .................... | G06F 12/0269 |

(Continued)

OTHER PUBLICATIONS

Bolz, et al., "Allocation Removal by Partial Evaluation in a Tracing JIT," Proceedings of the 20th ACM SIGPLAN Workshop on Partial Evaluation and Program Manipulation, PEPM '11, Jan. 2011, pp. 43-52, ACM Digital Library, accessed Aug. 24, 2023, https://doi.org/10.1145/1929501.1929508.

(Continued)

*Primary Examiner* — Wei Y Mui
*Assistant Examiner* — Brahim Bourzik
(74) *Attorney, Agent, or Firm* — Yee & Associates, P.C.

(57) ABSTRACT

Dynamic trace sizing for tracing just-in-time compilation is provided. A trace of a program is generated during a tracing phase of the just-in-time compilation. The trace of the program is profiled to determine an estimated effective trace size prior to compiling the trace. Additional profiling is performed to determine a garbage collection time and consequently a total execution time of the program based on the estimated effective trace size determined prior to compiling the trace. It is determined whether to continue formation of the trace or trigger termination of the trace based on the garbage collection time of the program. Triggering the termination of the trace dynamically sizes the trace at runtime of the program.

20 Claims, 5 Drawing Sheets

(56) References Cited

U.S. PATENT DOCUMENTS

| | | | | |
|---|---|---|---|---|
| 2008/0098364 | A1* | 4/2008 | Gray-Donald | G06F 11/3476 |
| | | | | 717/130 |
| 2013/0055226 | A1* | 2/2013 | Hayashizaki | G06F 11/3612 |
| | | | | 717/158 |
| 2017/0351603 | A1* | 12/2017 | Zhang | G06F 3/0604 |
| 2018/0067835 | A1* | 3/2018 | Hildebrand | G06F 11/3495 |
| 2020/0334129 | A1* | 10/2020 | Myers | G06F 11/3636 |

OTHER PUBLICATIONS

Chen, et al., "Dynamic Trace Selection Using Performance Monitoring Hardware Sampling," Proceedings of the International Symposium on Code Generation and Optimization, 2003, pp. 79-90, IEEE, accessed Aug. 24, 2023, https://ieeexplore.ieee.org/document/1191535.

Ericksson et al., "Profiling and Tracing Tools for Performance Analysis of Large Scale Applications," Zenodo, Mar. 22, 2017, 30 pages, Partnership for Advanced Computing in Europe, accessed Aug. 24, 2023, https://zenodo.org/record/830390.

Ilbeyi, "Co-Optimizing Hardware Design and Meta-Tracing Just-in-Time Compilation," eCommons, May 30, 2019, 186 pages, Cornell University Library, accessed Aug. 24, 2023, https://ecommons.cornell.edu/handle/1813/67316.

Ismail, et al., "Efficient nursery sizing for managed languages on multi-core processors with shared caches," CGO 2020: Proceedings of the 18th ACM/IEEE International Symposium on Code Generation and Optimization, Feb. 2020, pp. 1-15, ACM Digital Library, accessed Aug. 24, 2023, https://doi.org/10.1145/3368826.3377908.

Izawa, "Threaded Code Generation with a Meta-Tracing JIT Compiler," Journal of Object Technology, 2021, 11 pages, Cornell University, accessed Aug. 24, 2023, https://arxiv.org/abs/2106.12496.

Lopes, "Torchy: A Tracing JIT Compiler for PyTorch," In Proceedings of the 32nd ACM SIGPLAN International Conference on Compiler Construction, 2023, pp. 98-109, ACM Digital Library, accessed Aug. 24, 2023, https://dl.acm.org/doi/abs/10.1145/3578360.3580266.

Merrill, et al., "Trace fragment selection within method-based JVMs," In Proceedings of the fourth ACM SIGPLAN/SIGOPS international conference on Virtual execution environments, Mar. 2008, pp. 41-50, ACM Digital Library, accessed Aug. 24, 2023, https://dl.acm.org/doi/abs/10.1145/1346256.1346263.

Morton, et al., "Costing JIT Traces," Enlighten Publications, 2015, 20 pages, University of Glasgow, accessed Aug. 24, 2023, http://eprints.gla.ac.uk/113615/.

Grace Period Disclosure: Nanjekye et al., "The Garbage Collection Cost For Meta-Tracing JIT-based Dynamic," Proceedings of the 32nd Annual International Conference on Computer Science and Software Engineering (CASCON '22,) Nov. 15, 2022, pp. 140-149, https://dl.acm.org/doi/abs/10.5555/3566055.3566071.

Pape, et al., "Adaptive just-in-time value class optimization for lowering memory consumption and improving execution time performance," Science of Computer Programming, Jun. 15, 2017, pp. 17-29, vol. 140, Elsevier B. V., accessed Aug. 24, 2023, http://dx.doi.org/10.1016/j.scico.2016.08.003.

Github. "PyPy/RPython tutorial—Aheui JIT interpreter with pypy/rpython", aheui/paheui, May 28, 2022, 6 pages, https://web.archive.org/web/202205280858/https://github.com/aheui/rpaheui/blob/master/LOG.md.

Wikipedia. "PyPy", retrieved from web https://web.archive.org/web/20230708215442/https://en.wikipedia.org/wiki/PyPy, Jul. 8, 2023, 5 pages.

Wikipedia, "Tracing just-in-time compilation", retrieved from https://web.archive.org/web/20230709085006/https://en.wikipedia.org/wiki/Tracing_just-in-time_compilation, Jul. 9, 2023, 4 pages.

* cited by examiner

COMPUTING ENVIRONMENT
100

FIG. 1

COMPUTER    <u>101</u>

PROCESSOR SET    <u>110</u>

120 — PROCESSING CIRCUITRY     CACHE — 121

111 — COMMUNICATION FABRIC

112 — VOLATILE MEMORY

PERSISTENT STORAGE    <u>113</u>

122 — OPERATING SYSTEM

107 — PROGRAM

OPTIMAL JIT TRACE SIZING CODE — 200

PERIPHERAL DEVICE SET    <u>114</u>

123 — UI DEVICE SET     124 — STORAGE     IoT SENSOR SET — 125

NETWORK MODULE   <u>115</u>

103

END USER DEVICE

PRIVATE CLOUD

106

WAN <u>102</u>

REMOTE SERVER

REMOTE DATABASE

130

104

GATEWAY   <u>140</u>

PUBLIC CLOUD   <u>105</u>

141 — CLOUD ORCHESTRATION MODULE     HOST PHYSICAL MACHINE SET — 142

143 — VIRTUAL MACHINE SET     CONTAINER SET — 144

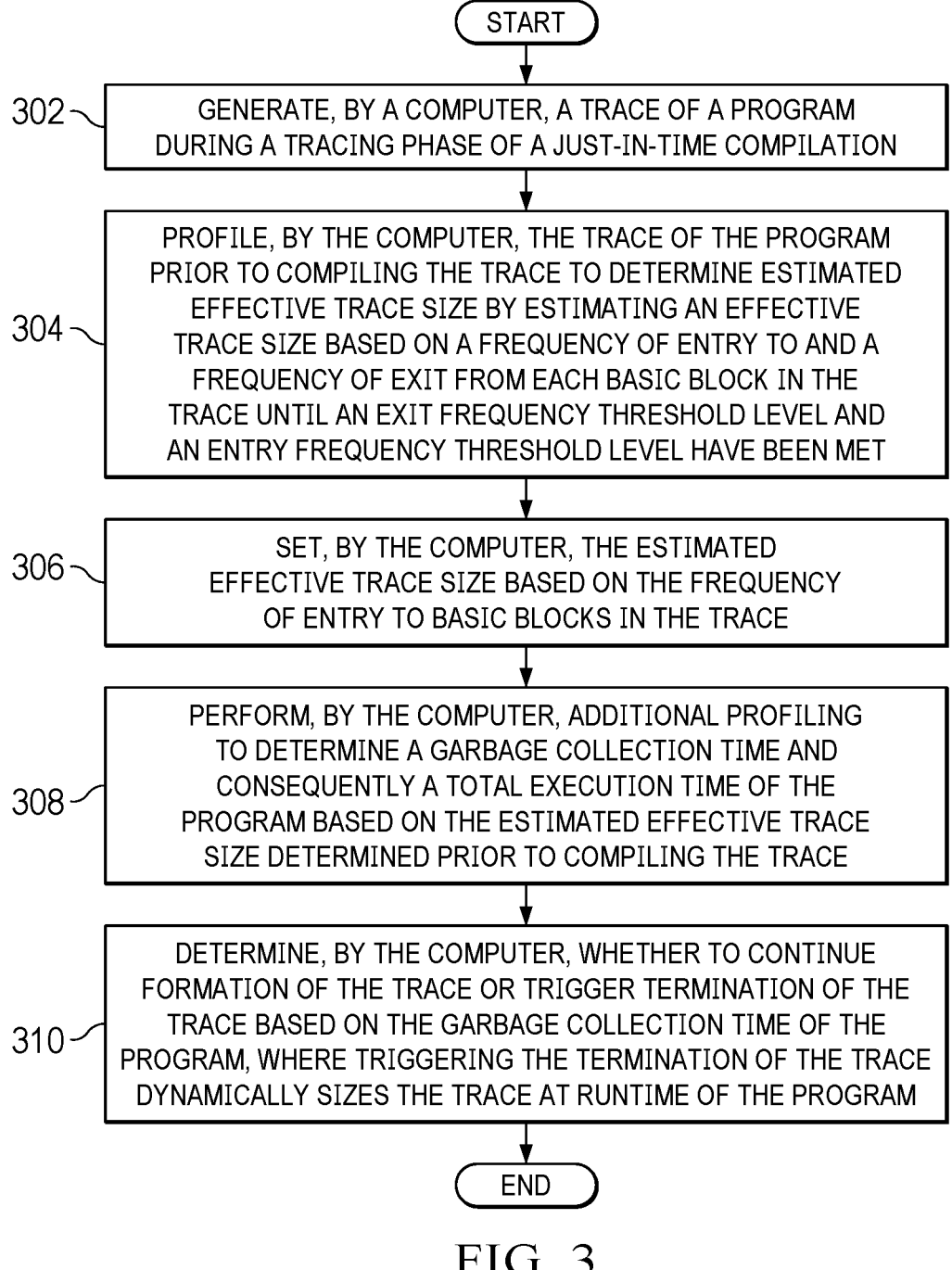

START

302 — GENERATE, BY A COMPUTER, A TRACE OF A PROGRAM DURING A TRACING PHASE OF A JUST-IN-TIME COMPILATION

304 — PROFILE, BY THE COMPUTER, THE TRACE OF THE PROGRAM PRIOR TO COMPILING THE TRACE TO DETERMINE ESTIMATED EFFECTIVE TRACE SIZE BY ESTIMATING AN EFFECTIVE TRACE SIZE BASED ON A FREQUENCY OF ENTRY TO AND A FREQUENCY OF EXIT FROM EACH BASIC BLOCK IN THE TRACE UNTIL AN EXIT FREQUENCY THRESHOLD LEVEL AND AN ENTRY FREQUENCY THRESHOLD LEVEL HAVE BEEN MET

306 — SET, BY THE COMPUTER, THE ESTIMATED EFFECTIVE TRACE SIZE BASED ON THE FREQUENCY OF ENTRY TO BASIC BLOCKS IN THE TRACE

308 — PERFORM, BY THE COMPUTER, ADDITIONAL PROFILING TO DETERMINE A GARBAGE COLLECTION TIME AND CONSEQUENTLY A TOTAL EXECUTION TIME OF THE PROGRAM BASED ON THE ESTIMATED EFFECTIVE TRACE SIZE DETERMINED PRIOR TO COMPILING THE TRACE

310 — DETERMINE, BY THE COMPUTER, WHETHER TO CONTINUE FORMATION OF THE TRACE OR TRIGGER TERMINATION OF THE TRACE BASED ON THE GARBAGE COLLECTION TIME OF THE PROGRAM, WHERE TRIGGERING THE TERMINATION OF THE TRACE DYNAMICALLY SIZES THE TRACE AT RUNTIME OF THE PROGRAM

END

FIG. 3

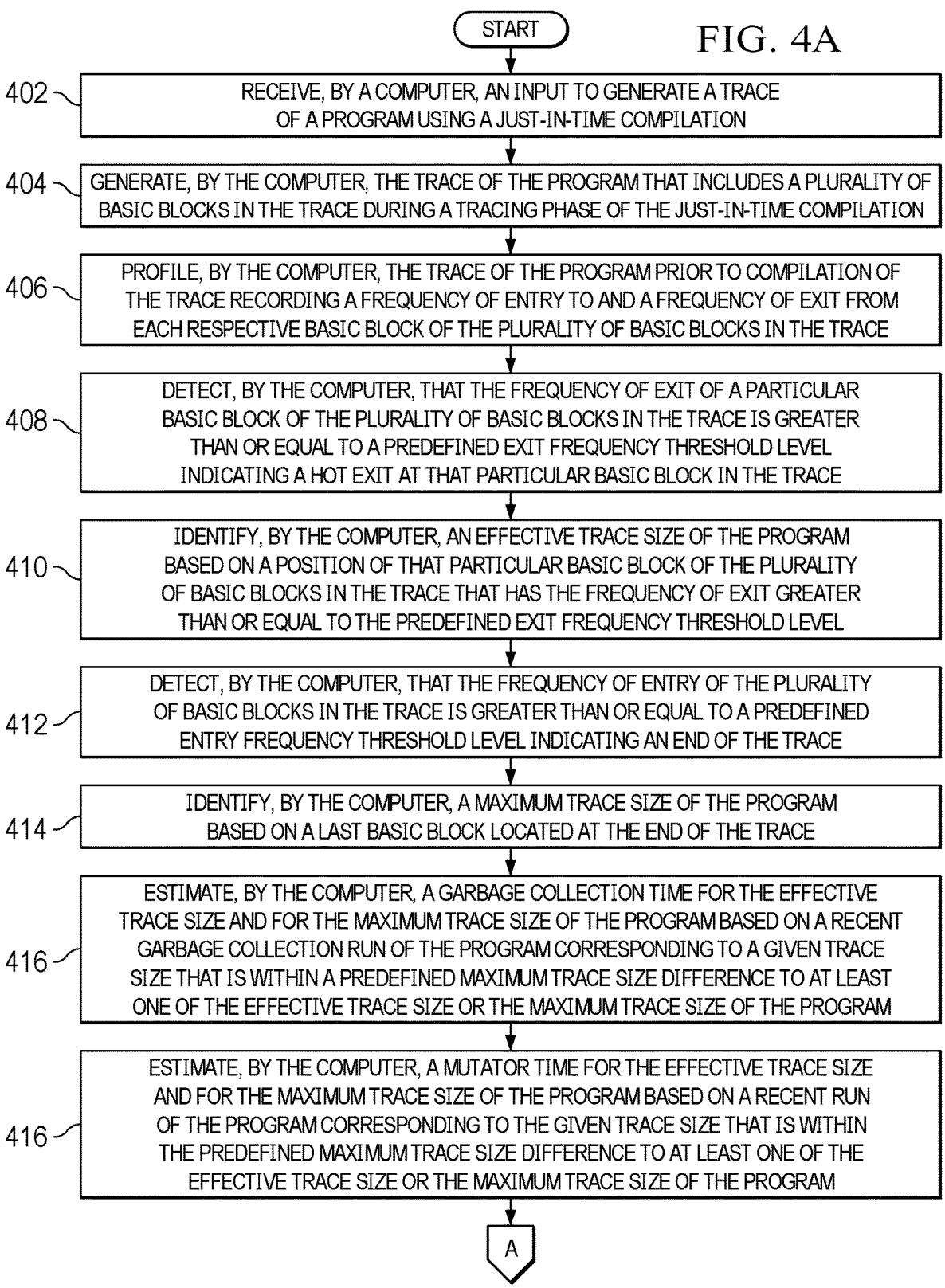

FIG. 4A

START

402 — RECEIVE, BY A COMPUTER, AN INPUT TO GENERATE A TRACE OF A PROGRAM USING A JUST-IN-TIME COMPILATION

404 — GENERATE, BY THE COMPUTER, THE TRACE OF THE PROGRAM THAT INCLUDES A PLURALITY OF BASIC BLOCKS IN THE TRACE DURING A TRACING PHASE OF THE JUST-IN-TIME COMPILATION

406 — PROFILE, BY THE COMPUTER, THE TRACE OF THE PROGRAM PRIOR TO COMPILATION OF THE TRACE RECORDING A FREQUENCY OF ENTRY TO AND A FREQUENCY OF EXIT FROM EACH RESPECTIVE BASIC BLOCK OF THE PLURALITY OF BASIC BLOCKS IN THE TRACE

408 — DETECT, BY THE COMPUTER, THAT THE FREQUENCY OF EXIT OF A PARTICULAR BASIC BLOCK OF THE PLURALITY OF BASIC BLOCKS IN THE TRACE IS GREATER THAN OR EQUAL TO A PREDEFINED EXIT FREQUENCY THRESHOLD LEVEL INDICATING A HOT EXIT AT THAT PARTICULAR BASIC BLOCK IN THE TRACE

410 — IDENTIFY, BY THE COMPUTER, AN EFFECTIVE TRACE SIZE OF THE PROGRAM BASED ON A POSITION OF THAT PARTICULAR BASIC BLOCK OF THE PLURALITY OF BASIC BLOCKS IN THE TRACE THAT HAS THE FREQUENCY OF EXIT GREATER THAN OR EQUAL TO THE PREDEFINED EXIT FREQUENCY THRESHOLD LEVEL

412 — DETECT, BY THE COMPUTER, THAT THE FREQUENCY OF ENTRY OF THE PLURALITY OF BASIC BLOCKS IN THE TRACE IS GREATER THAN OR EQUAL TO A PREDEFINED ENTRY FREQUENCY THRESHOLD LEVEL INDICATING AN END OF THE TRACE

414 — IDENTIFY, BY THE COMPUTER, A MAXIMUM TRACE SIZE OF THE PROGRAM BASED ON A LAST BASIC BLOCK LOCATED AT THE END OF THE TRACE

416 — ESTIMATE, BY THE COMPUTER, A GARBAGE COLLECTION TIME FOR THE EFFECTIVE TRACE SIZE AND FOR THE MAXIMUM TRACE SIZE OF THE PROGRAM BASED ON A RECENT GARBAGE COLLECTION RUN OF THE PROGRAM CORRESPONDING TO A GIVEN TRACE SIZE THAT IS WITHIN A PREDEFINED MAXIMUM TRACE SIZE DIFFERENCE TO AT LEAST ONE OF THE EFFECTIVE TRACE SIZE OR THE MAXIMUM TRACE SIZE OF THE PROGRAM

416 — ESTIMATE, BY THE COMPUTER, A MUTATOR TIME FOR THE EFFECTIVE TRACE SIZE AND FOR THE MAXIMUM TRACE SIZE OF THE PROGRAM BASED ON A RECENT RUN OF THE PROGRAM CORRESPONDING TO THE GIVEN TRACE SIZE THAT IS WITHIN THE PREDEFINED MAXIMUM TRACE SIZE DIFFERENCE TO AT LEAST ONE OF THE EFFECTIVE TRACE SIZE OR THE MAXIMUM TRACE SIZE OF THE PROGRAM

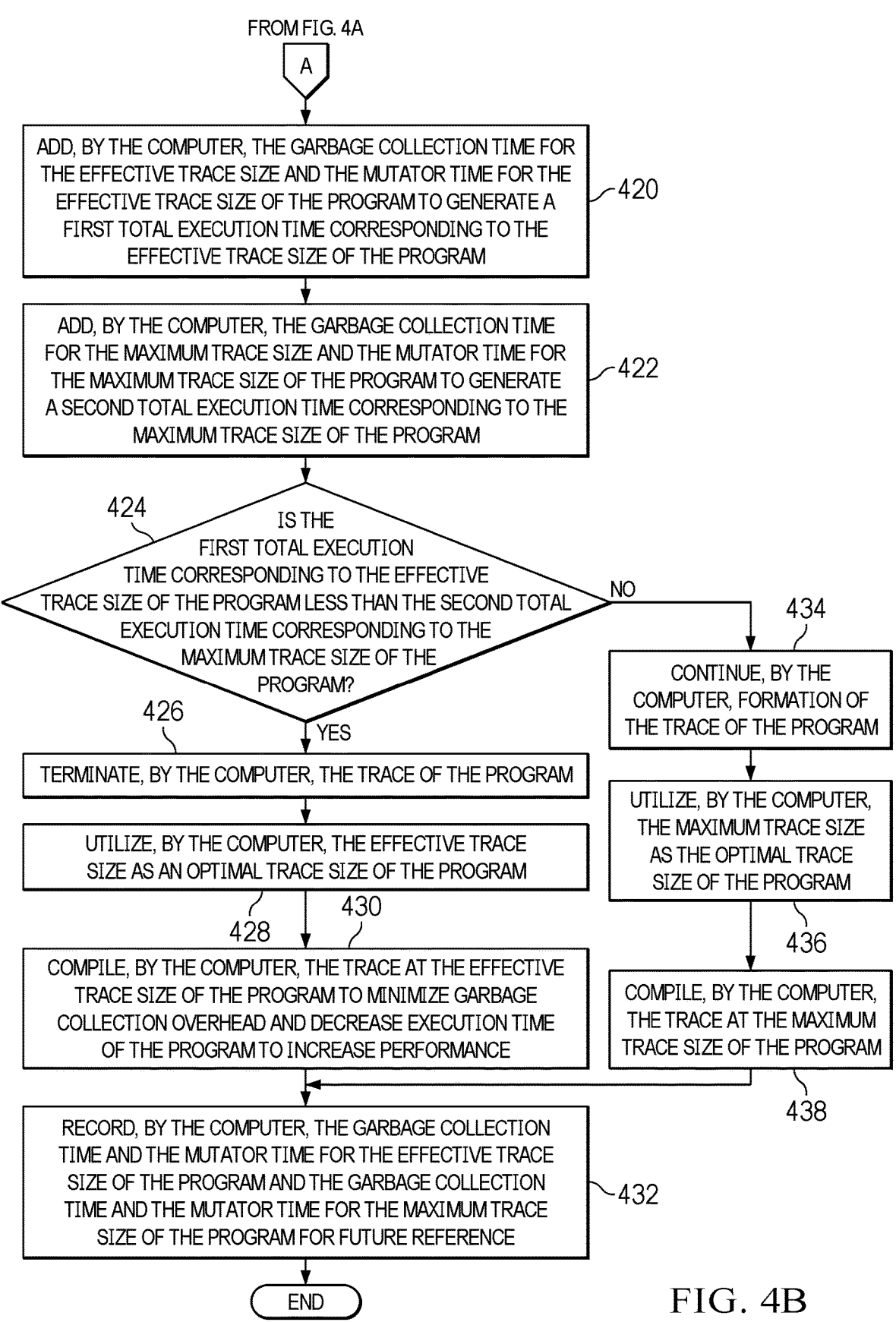

FROM FIG. 4A

A

ADD, BY THE COMPUTER, THE GARBAGE COLLECTION TIME FOR THE EFFECTIVE TRACE SIZE AND THE MUTATOR TIME FOR THE EFFECTIVE TRACE SIZE OF THE PROGRAM TO GENERATE A FIRST TOTAL EXECUTION TIME CORRESPONDING TO THE EFFECTIVE TRACE SIZE OF THE PROGRAM — 420

ADD, BY THE COMPUTER, THE GARBAGE COLLECTION TIME FOR THE MAXIMUM TRACE SIZE AND THE MUTATOR TIME FOR THE MAXIMUM TRACE SIZE OF THE PROGRAM TO GENERATE A SECOND TOTAL EXECUTION TIME CORRESPONDING TO THE MAXIMUM TRACE SIZE OF THE PROGRAM — 422

424 — IS THE FIRST TOTAL EXECUTION TIME CORRESPONDING TO THE EFFECTIVE TRACE SIZE OF THE PROGRAM LESS THAN THE SECOND TOTAL EXECUTION TIME CORRESPONDING TO THE MAXIMUM TRACE SIZE OF THE PROGRAM?

NO → 434

CONTINUE, BY THE COMPUTER, FORMATION OF THE TRACE OF THE PROGRAM

YES

426 — TERMINATE, BY THE COMPUTER, THE TRACE OF THE PROGRAM

UTILIZE, BY THE COMPUTER, THE MAXIMUM TRACE SIZE AS THE OPTIMAL TRACE SIZE OF THE PROGRAM

UTILIZE, BY THE COMPUTER, THE EFFECTIVE TRACE SIZE AS AN OPTIMAL TRACE SIZE OF THE PROGRAM 428    430

436

COMPILE, BY THE COMPUTER, THE TRACE AT THE EFFECTIVE TRACE SIZE OF THE PROGRAM TO MINIMIZE GARBAGE COLLECTION OVERHEAD AND DECREASE EXECUTION TIME OF THE PROGRAM TO INCREASE PERFORMANCE

COMPILE, BY THE COMPUTER, THE TRACE AT THE MAXIMUM TRACE SIZE OF THE PROGRAM

438

RECORD, BY THE COMPUTER, THE GARBAGE COLLECTION TIME AND THE MUTATOR TIME FOR THE EFFECTIVE TRACE SIZE OF THE PROGRAM AND THE GARBAGE COLLECTION TIME AND THE MUTATOR TIME FOR THE MAXIMUM TRACE SIZE OF THE PROGRAM FOR FUTURE REFERENCE — 432

END

FIG. 4B

OPTIMAL JUST-IN-TIME TRACE SIZING FOR VIRTUAL MACHINES

The following disclosure is submitted under 35 U.S.C. 102 (b)(1)(A): DISCLOSURE: The Garbage Collection Cost for Meta-Tracing JIT-Based Dynamic Languages, Joannah Nanjekye, David Bremner, and Aleksandar Micic, date made publicly available Nov. 15, 2022, 10 pages.

BACKGROUND

The disclosure relates generally to garbage collection and more specifically to garbage collection in relation to generating a trace of a program by a tracing just-in-time compiler.

Garbage collection is a process by which programs perform automatic memory management. Programs compile to bytecode that can be run on a virtual machine. When programs run on a virtual machine, objects are created on the heap, which is a portion of memory dedicated to the program. Eventually, some objects will no longer be needed. An in-use object, or a referenced object, means that some part of the program still maintains a pointer to that object. An unused or unreferenced object is no longer referenced by any part of the program. Thus, the memory used by an unused or unreferenced object can be reclaimed. The garbage collector automatically finds these unused objects and deletes them to free up memory.

SUMMARY

According to one illustrative embodiment, a computer-implemented method for dynamic trace sizing for tracing just-in-time compilation is provided. A computer generates a trace of a program during a tracing phase of the just-in-time compilation. The computer profiles the trace of the program to determine an estimated effective trace size prior to compiling the trace. The computer performs additional profiling to determine a garbage collection time and consequently a total execution time of the program based on the estimated effective trace size determined prior to compiling the trace. The computer determines whether to continue formation of the trace or trigger termination of the trace based on the garbage collection time of the program. The computer triggering the termination of the trace dynamically sizes the trace at runtime of the program. According to other illustrative embodiments, a computer system and computer program product for dynamic trace sizing for tracing just-in-time compilation are provided.

BRIEF DESCRIPTION OF THE DRAWINGS

FIG. 1 is a pictorial representation of a computing environment in which illustrative embodiments may be implemented;

FIG. 3 is a flowchart illustrating a process for dynamic trace sizing for trace-based just-in-time compilation of a program in accordance with an illustrative embodiment; and FIGS. 4A-4B are a flowchart illustrating a process for determining an optimal trace size for a program in accordance with an illustrative embodiment.

DETAILED DESCRIPTION

Figure 2:
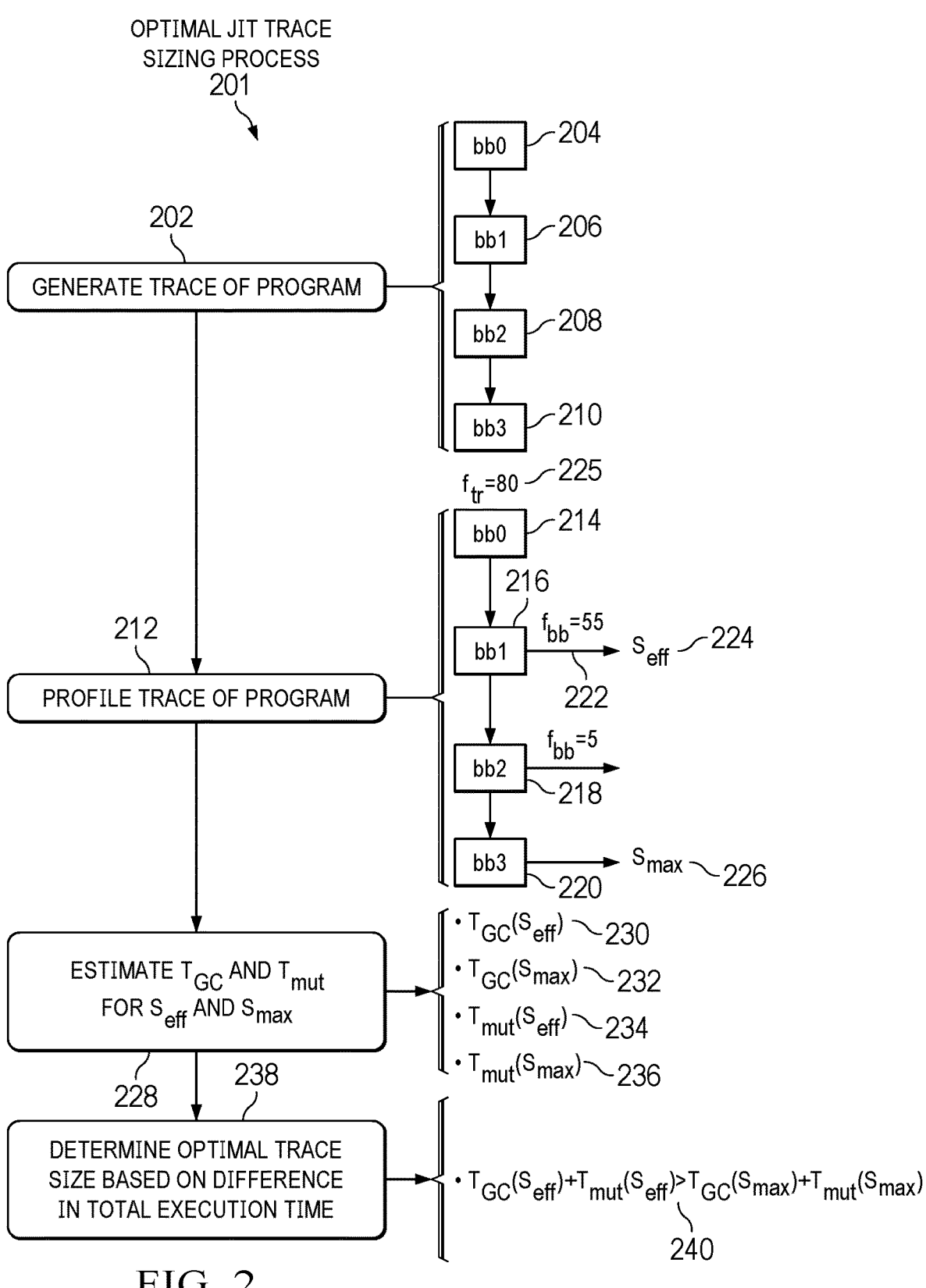
FIG. 2 is a diagram illustrating an example of an optimal JIT trace sizing process in accordance with an illustrative embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIG. 1, a diagram of a data processing environment is provided in which illustrative embodiments may be implemented. It should be appreciated that FIG. 1 is only meant as an example and is not intended to assert or imply any limitation with regard to the environments in which different embodiments may be implemented. Many modifications to the depicted environment may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as optimal just-in-time (JIT) trace sizing code 200. For example, optimal JIT trace sizing code 200 enables a user (e.g., a program developer) to benefit from a JIT trace of a program, such as program 107, by tracing all processes, but at the same time using trace profiling information corresponding to phases (e.g., garbage collection phase, mutator phase, and the like) of the program prior to trace compilation to ensure that the garbage collection overhead does not negate the performance benefits gained from the JIT compiler optimizations. Optimal JIT trace sizing code 200 of illustrative embodiments can be implemented in, for example, a tracing just-in-time compiler. Also, program 107 can represent any type of program, such as, for example, an object-oriented program or the like. Optimal trace sizing code 200 dynamically sizes the just-in-time compiler trace of the program to an optimal trace size to minimize the garbage collection overhead and decrease program execution time using current program phase information.

In addition to optimal trace sizing code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122, program 107, and optimal trace sizing code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in optimal trace sizing code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a program developer utilizing the optimal trace sizing services provided by computer 101), and may take any of the forms discussed above in connection with computer 101. EUD 103 typically receives helpful and useful data from the operations of computer 101. For example, in a hypothetical case where computer 101 is designed to provide an optimal trace size recommendation to the end user, this recommendation would typically be communicated from network module 115 of computer 101 through WAN 102 to EUD 103. In this way, EUD 103 can display, or otherwise present, the recommendation to the end user. In some embodiments, EUD 103 may be a client device, such as thin client, heavy client, mainframe computer, desktop computer, laptop computer, tablet computer, smart phone, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide an optimal trace size recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In computer systems and programming languages, garbage collection is a component of automatic memory management concerned with both allocation of new objects and deallocation of objects when an object is no longer in use. An in-use object means that a program references that object and an unused object means that the program no longer references that object. While garbage collection is convenient for programmers because it frees programmers from memory errors common in manual memory management, garbage collection comes with performance overhead. Garbage collection overhead impacts architectures, programs, and programming languages disparately. For programming languages, certain implementation decisions affect garbage collection. One such implementation detail is tracing in trace-based just-in-time compilers.

Illustrative embodiments perform program tracing utilizing trace-based just-in-time compilers. Typically, tracing just-in-time compilers are used in a hybrid mode consisting of both an interpreter and a compiler. The interpreter executes the program and performs profiling to identify the frequently executed paths, also known as hot paths of the program. The tracing just-in-time compiler optimizes these hot paths of the program by recording every instruction in an execution path to form a trace and then converts the trace into machine code for execution by a processor. Therefore, a trace in a tracing just-in-time compiler is a sequence of instructions, generated at runtime, depicting the actual execution behavior of the program. Traditional tracing just-in-time compilers form traces for the execution of code for a given program, which correspond to the machine code executed for the target program.

A typical tracing just-in-time compiler includes a plurality of different phases. For example, interpretation of a target program is the first phase, where the interpreter performs general execution and profiling of the program code to detect any hot paths in the program. The second phase is tracing where the interpreter traces any identified hot paths in the program, forming a sequence of all the operations encountered during execution of a particular hot path, which forms the trace. The third phase is compilation. During compilation, the tracing just-in-time compiler compiles the hot paths before execution with optional calls to functions compiled ahead-of-time (AOT). The tracing just-in-time compiler makes callbacks to virtual machine libraries and certain virtual machine components, such as a garbage collector. As a result, the tracing just-in-time compiler also goes through a garbage collection phase before the black hole interpreter performs any required deoptimization.

A current trend in tracing just-in-time compilers is to trace the execution of the interpreter as the interpreter executes the program code. This technique is known as meta tracing. In contrast to traditional just-in-time tracing, meta-tracing is costly for tracing, garbage collection, and execution of the compiled code because as much as traditional tracing justin-time compilers can potentially also make calls to the just-in-time framework from within the just-in-time compiled code, there is the potential for many more calls using meta-tracing.

Each phase of the tracing just-in-time compiler described above introduces performance overhead and impacts each program differently. For example, garbage collection overhead is more prominent in memory-intensive programs. Most of the garbage collection overhead is before just-in-time compilation thanks to escape analysis that removes some allocations, but the compiled code also pressures or stresses garbage collection, which makes garbage collection optimization necessary.

The risk of performance overhead is more likely when a trace is extremely long because not only do optimizations take a long time, but this also means more work for the garbage collector. This is because the number of dynamic instructions to be handled by the garbage collector increases and directly translates to higher garbage collection execution times. Tracing just-in-time compilers usually have a trace size limit, which controls how long a trace can be in terms of number of instructions. For example, a trace size limit for a particular programming language implementation can be 6000 instructions.

Memory-wise, it has been observed that there is an increase in resident set size in memory with an increase in trace size. Resident set size is the portion of memory occupied by a program. The resident set size remains constant when the maximum trace size of a program is reached. Generally, performance benefits exist for longer traces because a long trace allows more opportunity for the just-in-time compiler to optimize the program. For example, increasing the trace size limit can improve program execution time up to some point.

As noted above, the tracing just-in-time compiler has a trace size limit. When the tracing just-in-time compiler reaches the trace size limit, the tracing just-in-time compiler halts trace formation but a static or hard coded trace size is not always efficient. In other words, the trace size may not be the best or optimal trace size for all programs. Based on empirical analysis, illustrative embodiments prove and illustrate the following observations: 1) the optimal trace size is program specific; and 2) increasing the trace size improves performance up to a program-specific point, after which memory and garbage collection utilization degrade program performance. Based on these two observations, illustrative embodiments dynamically manage the size of the trace. Thus, illustrative embodiments provide garbage collection-aware trace sizing that is based on profiling to reduce garbage collection overhead, which has significant effects in reducing program execution time. Reducing program execution time increases system performance by decreasing system resource utilization.

For example, illustrative embodiments utilize profiling information during formation of a trace. During program tracing, illustrative embodiments record profiling information regarding program phase. Illustrative embodiments utilize this profiling information to determine when to terminate trace formation such that garbage collection overhead is minimized.

For example, this garbage collection-aware dynamic trace sizing of illustrative embodiments does not immediately compile a trace of a program. For example, while the trace is in an uncompiled state, illustrative embodiments record frequency of exits from each of the basic blocks in the trace, along with any related profiling information on program execution time (i.e., garbage collection time and mutator time). From this recorded information (i.e., frequency of exits from the basic blocks in the trace, along with the garbage collection time and the mutator time), illustrative embodiments identify any hot exit of the trace, which illustrative embodiments utilize to estimate the effective trace size of the program. Illustrative embodiments then estimate the total execution time of the program at this trace size. Illustrative embodiments utilize the estimated total execution time of the program at this trace size to determine either to continue trace formation or to trigger trace termination. The total program execution time of the program comprises both the garbage collection time and the mutator time. The mutator time is the remainder of the time spent running the program code without garbage collection. By triggering trace termination, illustrative embodiments dynamically size the trace of the program at runtime.

Illustrative embodiments efficiently size the trace using trace-based profiling to establish the trace size when just-in-time optimization opportunities are high and garbage collection overhead is low. For example, illustrative embodiments generate efficient traces before trace compilation for decreased program code size, decreased compilation time, and decreased program startup time while maintaining reliable steady-state performance (i.e., not impacting program execution time negatively).

The tracing just-in-time compiler compiles traces at a point where static program information is not available. Therefore, profiling of traces by illustrative embodiments makes it possible to take advantage of runtime information during compilation. The dynamic trace sizing of illustrative embodiments profiles both the trace of the program and any other program runtime information to dynamically improve trace formation. To achieve the dynamic trace sizing of illustrative embodiments that is garbage collection-aware ensuring lower garbage collection overhead, illustrative embodiments take into account and address the following technical challenges: 1) how an optimal trace size changes; 2) how to obtain individual program characteristics that indicate the program phase at runtime; and 3) how to efficiently determine the optimal trace size.

To address the first challenge of understanding how the optimal trace size changes, illustrative embodiments first optimize the trace during the interpretation phase of the tracing just-in-time compiler. In other words, when the interpreter enters the tracing mode, illustrative embodiments generate a trace of the program that includes a plurality of basic blocks of the trace. A basic block of the trace is a code sequence of a hot path in the program with no branches in except at entry and no branches out except at the exit. However, prior to illustrative embodiments committing the trace for compilation, illustrative embodiments profile the trace recording profiling information regarding the trace and the basic blocks of the trace.

For example, illustrative embodiments record the frequency of entry, $f_{tr}$, to each respective basic block of the trace, as well as the frequency of exit, $f_{bb}$, from each respective basic block of the trace. Illustrative embodiments determine the execution frequencies of the trace and the basic blocks of the trace from the entry frequency and exit frequency of the trace and of each respective basic block. With this information regarding the trace and additional phase information, illustrative embodiments are capable of generating an improved final trace by estimating: 1) the effective trace size, $S_{eff}$; 2) the maximum trace size, $S_{max}$; 3) the garbage collection time, $T_{GC}$; and 4) the mutator time, $T_{mut}$. In other words, illustrative embodiments determine the effective trace size, $S_{eff}$, and the maximum trace size, $S_{max}$, to determine the garbage collection time, $T_{GC}$, and the mutator time, $T_{mut}$, corresponding to the program.

During the profiling of the trace, the trace enters an intermediate state and does not leave this profiling phase until the entry count (i.e., the number of accesses to the basic blocks) of the trace exceeds a predefined entry frequency threshold, th. As an example, illustrative embodiments set the predefined entry frequency threshold, th, to 80. However, it should be noted that the predefined entry frequency threshold of 80 is intended as an example only and not as a limitation on illustrative embodiments. In other words, illustrative embodiments can set the predefined entry frequency threshold at any level. Before a trace reaches this predefined entry frequency threshold, illustrative embodiments also set an exit count (i.e., the number of exits from each basic block) of the trace. If the basic block exit count, $f_{bb}$, for a particular basic block is less than a predefined fraction, $\lambda$, of the basic block entry count, $f_{tr}$, (i.e., $f_{bb}/f_{tr}<\lambda$), then that particular basic block is a cold exit. It should be noted that $\lambda$ is also a predefined threshold level. Conversely, if the basic block exit count, $f_{bb}$, for a particular basic block is greater than the predefined exit threshold level, then that particular basic block is a hot exit.

Therefore, at this certain point in time, $T_{clock}$, illustrative embodiments have generated a full trace so far at a cold exit, and a prediction of the basic block that is likely to determine trace termination at a hot exit. The size of the intermediate representation of the trace is the size of the total trace, $S_{max}$, generated so far at this point in time, $T_{clock}$, ($S_{max}(T_{clock})$). The hot exit basic block of the trace determines a subset of the full trace (i.e., the effective trace), which is the trace for basic blocks whose entry frequencies exceed the predefined entry frequency threshold, th. This effective trace has a size, which is the effective trace size at this point in time, $S_{eff}(T_{clock})$. Therefore, the basic block with an exit frequency greater than or equal to the exit frequency threshold determines the effective trace size, $S_{eff}$, while the last basic block in the trace determines the maximum trace size, $S_{max}$, because illustrative embodiments determine the different trace sizes at these particular basic blocks in the trace.

Illustrative embodiments utilize the effective trace size, $S_{eff}$, and the maximum trace size, $S_{max}$, to estimate the garbage collection time, $T_{GC}$, and the mutator time, $T_{mut}$. Illustrative embodiments determine the total execution time of the program from estimating both the garbage collection time, $T_{GC}$, and the mutator time, $T_{mut}$, as follows:

$$T(S_N) = T_{mj}(S_N) + T_{mn}(S_N) + T_{mut}(S_N), \quad\quad \text{Eq(1)}$$

$$T_{GC}(S_N) = T_{mj}(S_N) + T_{mn}(S_N), \quad\quad \text{Eq(2)}$$

where $T(S_N)$ is the total execution time of the program at an arbitrary or given trace size $S_N$, $T_{mj}$ is the major garbage collection time, $T_{mn}$ is the minor garbage collection time, and $T_{mut}$ is the mutator time. In the context of generational garbage collection, the heap is divided into two sub regions, a young space, also known as nursery, and the old space also known as tenured space. Therefore, minor garbage collection refers to events of reclaiming memory for unused objects in the nursery, while major collection performs memory reclamation in the tenured space. The sum of the major garbage collection time, $T_{mj}$, and the minor garbage collection time, $T_{mn}$, equals the total garbage collection time or overhead, $T_{GC}$. However, based on empirical studies, illustrative embodiments do not take into consideration the minor garbage collection time because the minor garbage collection time is insignificant. Therefore, the total garbage collection overhead, $T_{GC}$, is approximately equal to the major garbage collection time as follows:

$$T_{GC}(S_N) \approx T_{mj}(S_N). \qquad \text{Eq(3)}$$

To estimate the difference in garbage collection time at the effective trace size, $S_{eff}$, and the maximum trace size, $S_{max}$, illustrative embodiments utilize observed garbage collection times from recent garbage collection runs. Illustrative embodiments record several garbage collection times from recent garbage collection runs, but do not necessarily take the arbitrary trace size, $S_N$, which corresponds to the most recent garbage collection run because this causes overestimation. Instead, illustrative embodiments select a garbage collection time from a less recent garbage collection run, where the arbitrary trace size, $S_N$, is close (i.e., within a predefined maximum trace size difference threshold level) to at least one of the effective trace size, $S_{eff}$, or the maximum trace size, $S_{max}$. Therefore, illustrative embodiments determine both the effective trace size, $S_{eff}$, and the maximum trace size, $S_{max}$, for the total garbage collection overhead, $T_{GC}$, as follows:

$$T_{GC}(S_{eff}) = T_{GC}(S_{neff}), \qquad \text{Eq(4)}$$

$$T_{GC}(S_{max}) = T_{GC}(S_{nmax}), \qquad \text{Eq(5)}$$

where $S_{neff}$ and $S_{nmax}$ for the arbitrary trace size are trace sizes close to the effective trace size, $S_{eff}$, and the maximum trace size, $S_{max}$, respectively. A trade-off exists between taking the garbage collection time from the recent garbage collection run because the recent garbage collection time is more accurate even though it represents the current program phase and taking the garbage collection time from a less recent garbage collection run that has a more realistic trace size.

Mutator time is the remaining time spent executing the program. However, in practice some garbage collection-related activities, such as, for example, write barriers, are executed by the mutator, but these garbage collection-related activities are difficult to isolate. Therefore, similar to garbage collection time estimation, illustrative embodiments also utilize an observed mutator time from a recent run of the program to estimate the mutator time. Illustrative embodiments estimate a trace size of either the effective trace size, $S_{eff}$, or the maximum trace size, $S_{max}$, for the mutator time. Therefore, illustrative embodiments determine both the effective trace size, $S_{eff}$, and the maximum trace size, $S_{max}$, for the mutator time as follows:

$$T_{mut}(S_{eff}) = T_{mut}(S_{neff}), \qquad \text{Eq(6)}$$

$$T_{mut}(S_{max}) = T_{mut}(S_{nmax}), \qquad \text{Eq(7)}$$

where $S_{neff}$ and $S_{nmax}$ for the arbitrary trace size are trace sizes close to the effective trace size, $S_{eff}$, and the maximum trace size, $S_{max}$, respectively. Illustrative embodiments incur the cost of profiling for the first run of the program, but improve program performance during subsequent program runs using the profiling information. In an alternative illustrative embodiment, the alternative illustrative embodiment assumes that at the effective trace size, $S_{eff}$, the alternative illustrative embodiment will experience the most realistic and feasible overhead as follows:

$$S_{bf} = S_N < S_{eff}, \qquad \text{Eq(8)}$$

$$S_{af} = S_N > S_{eff}, \qquad \text{Eq(9)}$$

$$T_{mut}(S_{eff}) = T_{mut}(S_{bf}), \qquad \text{Eq(10)}$$

$$T_{mut}(S_{max}) = T_{mut}(S_{af}). \qquad \text{Eq(11)}$$

As a result, illustrative embodiments measure the mutator time at $S_{bf}$ and another at $S_{af}$, which correspond to trace sizes just below, $S_{bf}$, and just above, $S_{af}$, the effective trace size, $S_{eff}$.

In response to illustrative embodiments determining the estimates above, illustrative embodiments determine whether to run at either the effective trace size, $S_{eff}$, or the maximum trace size, $S_{max}$, depending on the tradeoffs by computing the difference of the estimates to select the optimal trace size as follows:

$$T(S_{max}) = T_{GC}(S_{max}) + T_{mut}(S_{max}), \qquad \text{Eq(12)}$$

$$T(S_{eff}) = T_{GC}(S_{eff}) + T_{mut}(S_{eff}), \qquad \text{Eq(13)}$$

$$\Delta T = T(S_{max}) - T(S_{eff}), \qquad \text{Eq(14)}$$

where $T(S_{max})$ is the total execution time of the program at the maximum trace size, $T(S_{eff})$ is the total execution time of the program at the effective trace size, and $\Delta T$ is the difference in the total execution times.

Illustrative embodiments start by recording mutator time, which illustrative embodiments measure between trace-associated allocation calls until the maximum trace size is reached. Illustrative embodiments generate the trace, but do not commit the trace for compilation. Instead, illustrative embodiments profile the trace. During profiling of the trace, illustrative embodiments monitor the basic blocks in the trace for frequency of exits corresponding to each respective basic block exceeding a predefined exit frequency threshold level to determine a hot exit. If illustrative embodiment determine that an exit is hot, then illustrative embodiments terminate the trace and estimate the size of the trace to be the effective trace size, $S_{eff}$. Illustrative embodiments record both the effective trace size, $S_{eff}$, and the maximum trace size, $S_{max}$.

Illustrative embodiments estimate the change in mutator time and garbage collection time corresponding to both the maximum trace size, $S_{max}$, and the effective trace size, $S_{eff}$, to determine whether the optimal trace size should be the maximum trace size, $S_{max}$, or the effective trace size, $S_{eff}$. Illustrative embodiments make the determination by evaluating whether the condition $(T_{GC}(S_{eff})+T_{mut}(S_{eff}))>(T_{GC}(S_{max})+T_{mut}(S_{max}))$ is true or false. For example, if illustrative embodiments determine that $(T_{GC}(S_{eff})+T_{mut}(S_{eff}))>(T_{GC}(S_{max})+T_{mut}(S_{max}))$, then illustrative embodiments continue the trace and utilize the maximum trace size, $S_{max}$, as the optimal trace size for the program. Conversely, if illustrative embodiments determine that $(T_{GC}(S_{eff})+T_{mut}(S_{eff}))< (T_{GC}(S_{max})+T_{mut}(S_{max}))$, then illustrative embodiments terminate the trace and utilize the effective trace size, $S_{eff}$, as the optimal trace size for the program. Therefore, illustrative embodiments evaluate the expression $\Delta T_{GC}$+ $\Delta T_{mut}$ to determine whether illustrative embodiments set the optimal trace size at the maximum trace size, $S_{max}$, or the effective trace size, $S_{eff}$. In response to illustrative embodiments terminating the trace of the program, thereby setting the trace size, illustrative embodiments update the mutator time records and garbage collection time records to be used in estimating the change in garbage collection.

Thus, illustrative embodiments provide one or more technical solutions that overcome a technical problem with an inability of current solutions to generate an optimal trace size for a program to minimize garbage collection overhead, which increases performance. As a result, these one or more technical solutions provide a technical effect and practical application in the field of tracing just-in-time compilation of programs.

With reference now to FIG. 2, a diagram illustrating an example of an optimal JIT trace sizing process is depicted in accordance with an illustrative embodiment. Optimal trace sizing process 201 may be implemented in a computer, such as, for example, computer 101 in FIG. 1. For example, the computer may utilize optimal trace sizing code 200 in FIG. 1 to perform optimal trace sizing process 201.

In this example, optimal trace sizing process 201 starts at 202 where the computer generates a trace of a program, such as, for example, program 107 in FIG. 1. The trace of the program includes a plurality of basic blocks, such as basic block bb0 204, basic block bb1 206, basic block bb2 206, and basic block bb3 208. However, it should be noted that block bb0 204, basic block bb1 206, basic block bb2 208, and basic block bb3 210 are intended as examples only and not as limitations on illustrative embodiments. In other words, the computer can generate a trace that can include any number of basic blocks.

At 212, the computer profiles the trace of the program prior to compilation of the trace. During the profiling of the trace, the computer records the frequency of entry to and the frequency of exit from each respective basic block in the trace (i.e., basic block bb0 214, basic block bb1 216, basic block bb2 218, and basic block bb3 220). It should be noted that basic block bb0 214, basic block bb1 216, basic block bb2 218, and basic block bb3 220 are the same as basic block bb0 204, basic block bb1 206, basic block bb2 208, and basic block bb3 210 above. Also, the computer detects that the frequency of exit $f_{bb}$ 222 for basic block bb1 216 is greater than or equal to a predefined exit frequency threshold level. As a result, the computer identifies effective trace size $S_{eff}$ 224 for the program at basic block bb1 216.

In addition, the computer detects that frequency of entry $f_{tr}$ 225 for basic block bb0 214, basic block bb1 216, basic block bb2 218, and basic block bb3 220 is greater than or equal to a predefined entry frequency threshold level and determines that basic block bb3 220 is a last basic block in the trace. Consequently, the computer identifies maximum trace size $S_{max}$ 226 for the program at basic block bb3 220.

Then, at 228, the computer estimates the garbage collection time, $T_{GC}$, and the mutator time, $T_{mut}$, for the effective trace size $S_{eff}$ 224 and the garbage collection time, $T_{GC}$, and the mutator time, $T_{mut}$, for the maximum trace size $S_{max}$ 226, such as $T_{GC}(S_{eff})$ 230, $T_{GC}(S_{max})$ 232, $T_{mut}(S_{eff})$ 234, and $T_{mut}(S_{max})$ 236. At 238, the computer determines the optimal trace size of the program based on the difference in the total execution time of the program between the total of the garbage collection and mutator times for the effective trace size and the total of the garbage collection and mutator times for the maximum trace size as shown in condition 240. If the total of the garbage collection and mutator times for the effective trace size is greater than the total of the garbage collection and mutator times for the maximum trace size, then the computer continues formation of the trace and utilizes the maximum trace size as the optimal trace size for the program. Conversely, if the total of the garbage collection and mutator times for the effective trace size is less than the total of the garbage collection and mutator times for the maximum trace size, then the computer terminates the trace and utilizes the effective trace size as the optimal trace size for the program.

With reference now to FIG. 3, a flowchart illustrating a process for dynamic trace sizing for trace-based just-in-time compilation of a program is shown in accordance with an illustrative embodiment. The process shown in FIG. 3 may be implemented in a computer, such as, for example, computer 101 in FIG. 1. For example, the process shown in FIG. 3 may be implemented in optimal trace sizing code 200 in FIG. 1.

The process begins when the computer generates a trace of a program during a tracing phase of a just-in-time compilation (step 302). A tracing phase of a tracing just-in-time compiler is when the operations of an executing program are recorded into a buffer for later analysis and/or compilation. However, it should be noted that in some designs the tracing just-in-time compiler may return to this tracing phase many times during a single execution. The computer profiles the trace of the program prior to compiling the trace to determine an estimated effective trace size (step 304). The computer profiles the trace of the program prior to compiling the trace to determine an estimated effective trace size by estimating an effective trace size based on a frequency of entry to and a frequency of exit from each basic block in the trace until an exit frequency threshold level and an entry frequency threshold level have been met. The computer sets the estimated effective trace size based on the frequency of entry to basic blocks in the trace (step 306).

The computer performs additional profiling to determine a garbage collection time and consequently a total execution time of the program based on the estimated effective trace size determined prior to compiling the trace (step 308). The computer determines whether to continue formation of the trace or trigger termination of the trace based on the garbage collection time of the program (step 310). The computer triggering the termination of the trace dynamically sizes the trace at runtime of the program. Thereafter, the process terminates.

With reference now to FIGS. 4A-4B, a flowchart illustrating a process for determining an optimal trace size for a program is shown in accordance with an illustrative embodiment. The process shown in FIGS. 4A-4B may be implemented in a computer, such as, for example, computer 101 in FIG. 1. For example, the process shown in FIGS. 4A-4B may be implemented in optimal trace sizing code 200 in FIG. 1.

The process begins when the computer receives an input to generate a trace of a program using a just-in-time compilation (step 402). In response to receiving the input, the computer generates the trace of the program that includes a plurality of basic blocks in the trace during a tracing phase of the just-in-time compilation (step 404). The computer utilizes a tracing just-in-time compiler to generate the trace of the program.

The computer profiles the trace of the program prior to compilation of the trace recording a frequency of entry to and a frequency of exit from each respective basic block of the plurality of basic blocks in the trace (step 406). The computer detects that the frequency of exit of a particular basic block of the plurality of basic blocks in the trace is greater than or equal to a predefined exit frequency threshold level indicating a hot exit at that particular basic block in the trace (step 408). The computer identifies an effective trace size of the program based on a position of that particular basic block of the plurality of basic blocks in the trace that has the frequency of exit greater than or equal to the predefined exit frequency threshold level (step 410).

Subsequently, the computer detects that the frequency of entry of the plurality of basic blocks in the trace is greater than or equal to a predefined entry frequency threshold level indicating an end of the trace (step 412). The computer identifies a maximum trace size of the program based on a last basic block located at the end of the trace (step 414).

In addition, the computer estimates a garbage collection time for the effective trace size and for the maximum trace size of the program based on a recent garbage collection run of the program corresponding to a given trace size that is within a predefined maximum trace size difference to at least one of the effective trace size or the maximum trace size of the program (step 416). Further, the computer estimates a mutator time for the effective trace size and for the maximum trace size of the program based on a recent run of the program corresponding to the given trace size that is within the predefined maximum trace size difference to at least one of the effective trace size or the maximum trace size of the program (step 418).

The computer adds the garbage collection time for the effective trace size and the mutator time for the effective trace size of the program to generate a first total execution time corresponding to the effective trace size of the program (step 420). The computer also adds the garbage collection time for the maximum trace size and the mutator time for the maximum trace size of the program to generate a second total execution time corresponding to the maximum trace size of the program (step 422).

The computer makes a determination as to whether the first total execution time corresponding to the effective trace size of the program is less than the second total execution time corresponding to the maximum trace size of the program (step 424). If the computer determines that the first total execution time corresponding to the effective trace size of the program is less than the second total execution time corresponding to the maximum trace size of the program, yes output of step 424, then the computer terminates the trace of the program (step 426). In addition, the computer utilizes the effective trace size as an optimal trace size of the program (step 428). Furthermore, the computer compiles the trace at the effective trace size of the program to minimize garbage collection overhead and decrease execution time of the program to increase performance (step 430). Moreover, the computer records the garbage collection time and the mutator time for the effective trace size of the program and the garbage collection time and the mutator time for the maximum trace size of the program for future reference (step 432). Thereafter, the process terminates.

Returning again to step 424, if the computer determines that the first total execution time corresponding to the effective trace size of the program is not less than (i.e., is greater than) the second total execution time corresponding to the maximum trace size of the program, no output of step 424, then the computer continues formation of the trace of the program (step 434). In addition, the computer utilizes the maximum trace size as the optimal trace size of the program (step 436). Further, the computer compiles the trace at the maximum trace size of the program (step 438). Thereafter, the process returns to step 432 where the computer records the garbage collection and mutator times.

Thus, illustrative embodiments of the present disclosure provide a computer-implemented method, computer system, and computer program product for dynamic trace sizing for just-in-time compilation of a program. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamic trace sizing for tracing just-in-time compilation, the computer-implemented method comprising:

generating, by a computer, a trace of a program during a tracing phase of the just-in-time compilation;

profiling, by the computer, the trace of the program to determine an effective trace size prior to compiling the trace;

performing, by the computer, additional profiling to determine a garbage collection time and consequently a total execution time of the program based on the effective trace size determined prior to compiling the trace;

determining, by the computer, whether to continue formation of the trace or trigger termination of the trace based on the garbage collection time of the program, wherein the computer triggering the termination of the trace dynamically sizes the trace at runtime of the program;

determining, by the computer, whether a first total execution time corresponding to the effective trace size of the program is less than a second total execution time corresponding to a maximum trace size of the program; and compiling, by the computer, the trace at the effective trace size of the program to minimize garbage collection overhead and decrease execution time of the program to increase performance.

2. The computer-implemented method of claim 1, wherein the profiling of the trace of the program to determine the effective trace size prior to compiling the trace further comprises:

determining, by the computer, the effective trace size based on a frequency of entry to and a frequency of exit from each basic block in the trace until an exit frequency threshold level and an entry frequency threshold level have been met; and setting, by the computer, the effective trace size based on the frequency of entry to basic blocks in the trace.

3. The computer-implemented method of claim 1, further comprising:

receiving, by the computer, an input to generate the trace of the program using the just-in-time compilation;

generating, by the computer, the trace of the program that includes a plurality of basic blocks in the trace during the tracing phase of the just-in-time compilation; and profiling, by the computer, the trace of the program prior to compilation of the trace recording a frequency of entry to and a frequency of exit from each respective basic block of the plurality of basic blocks in the trace.

4. The computer-implemented method of claim 1, further comprising:

detecting, by the computer, that a frequency of exit of a particular basic block of a plurality of basic blocks in the trace is greater than or equal to a predefined exit frequency threshold level indicating a hot exit at that particular basic block in the trace; and identifying, by the computer, the effective trace size of the program based on a position of that particular basic block of the plurality of basic blocks in the trace that has the frequency of exit greater than or equal to the predefined exit frequency threshold level.

5. The computer-implemented method of claim 1, further comprising:

detecting, by the computer, that a frequency of entry of a plurality of basic blocks in the trace is greater than or equal to a predefined entry frequency threshold level indicating an end of the trace; and identifying, by the computer, the maximum trace size of the program based on a last basic block located at the end of the trace.

6. The computer-implemented method of claim 1, further comprising:

determining, by the computer, the garbage collection time for the effective trace size and for the maximum trace size of the program based on a recent garbage collection run of the program corresponding to a given trace size that is within a predefined maximum trace size difference to at least one of the effective trace size or the maximum trace size of the program; and determining, by the computer, a mutator time for the effective trace size and for the maximum trace size of the program based on a recent run of the program corresponding to the given trace size that is within the predefined maximum trace size difference to at least one of the effective trace size or the maximum trace size of the program.

7. The computer-implemented method of claim 1, further comprising:

adding, by the computer, the garbage collection time for the effective trace size and a mutator time for the effective trace size of the program to generate the first total execution time corresponding to the effective trace size of the program;

adding, by the computer, the garbage collection time for the maximum trace size and the mutator time for the maximum trace size of the program to generate the second total execution time corresponding to the maximum trace size of the program.

8. The computer-implemented method of claim 7, further comprising:

responsive to the computer determining that the first total execution time corresponding to the effective trace size of the program is less than the second total execution time corresponding to the maximum trace size of the program, terminating, by the computer, the trace of the program;

utilizing, by the computer, the effective trace size as an optimal trace size of the program; and recording, by the computer, the garbage collection time and the mutator time for the effective trace size of the program and the garbage collection time and the mutator time for the maximum trace size of the program for future reference.

9. The computer-implemented method of claim 7, further comprising:

responsive to the computer determining that the first total execution time corresponding to the effective trace size of the program is greater than the second total execution time corresponding to the maximum trace size of the program, continuing, by the computer, the formation of the trace of the program;

utilizing, by the computer, the maximum trace size as an optimal trace size of the program; and compiling, by the computer, the trace at the maximum trace size of the program.

10. A computer system for dynamic trace sizing for tracing just-in-time compilation, the computer system comprising:

a communication fabric;

a storage device connected to the communication fabric, wherein the storage device stores program instructions; and a processor connected to the communication fabric, wherein the processor executes the program instructions to:

generate a trace of a program during a tracing phase of the just-in-time compilation;

profile the trace of the program to determine an effective trace size prior to compiling the trace;

perform additional profiling to determine a garbage collection time and consequently a total execution time of the program based on the effective trace size determined prior to compiling the trace;

determine, whether to continue formation of the trace or trigger termination of the trace based on the garbage collection time of the program, wherein triggering the termination of the trace dynamically sizes the trace at runtime of the program;

determine whether a first total execution time corresponding to the effective trace size of the program is less than a second total execution time corresponding to a maximum trace size of the program; and compile the trace at the effective trace size of the program to minimize garbage collection overhead and decrease execution time of the program to increase performance.

11. The computer system of claim 10, wherein profiling the trace of the program to determine the effective trace size prior to compiling the trace further comprises:

determining an the effective trace size based on a frequency of entry to and a frequency of exit from each basic block in the trace until an exit frequency threshold level and an entry frequency threshold level have been met; and setting the effective trace size based on the frequency of access to basic blocks in the trace.

12. A computer program product for dynamic trace sizing for tracing just-in-time compilation, the computer program product comprising a computer-readable storage medium having program instructions embodied therewith, the program instructions executable by a computer to cause the computer to:

generate a trace of a program during a tracing phase of the just-in-time compilation;

profile the trace of the program to determine an effective trace size prior to compiling the trace;

perform additional profiling to determine a garbage collection time and consequently a total execution time of the program based on the effective trace size determined prior to compiling the trace;

determine whether to continue formation of the trace or trigger termination of the trace based on the garbage collection time of the program, wherein triggering the termination of the trace dynamically sizes the trace at runtime of the program;

determine whether a first total execution time corresponding to the effective trace size of the program is less than a second total execution time corresponding to a maximum trace size of the program; and compile the trace at the effective trace size of the program to minimize garbage collection overhead and decrease execution time of the program to increase performance.

13. The computer program product of claim 12, wherein profiling the trace of the program to determine the effective trace size prior to compiling the trace further comprises:

determining the effective trace size based on a frequency of entry to and a frequency of exit from each basic block in the trace until an exit frequency threshold level and an entry frequency threshold level have been met; and setting the effective trace size based on the frequency of entry to basic blocks in the trace.

14. The computer program product of claim 12, wherein the program instructions further cause the computer to:

receive an input to generate the trace of the program using the just-in-time compilation;

generate the trace of the program that includes a plurality of basic blocks in the trace during the tracing phase of the just-in-time compilation; and profile the trace of the program prior to compilation of the trace recording a frequency of entry to and a frequency of exit from each respective basic block of the plurality of basic blocks in the trace.

15. The computer program product of claim 12, wherein the program instructions further cause the computer to:

detect that a frequency of exit of a particular basic block of a plurality of basic blocks in the trace is greater than or equal to a predefined exit frequency threshold level indicating a hot exit at that particular basic block in the trace; and identify the effective trace size of the program based on a position of that particular basic block of the plurality of basic blocks in the trace that has the frequency of exit greater than or equal to the predefined exit frequency threshold level.

16. The computer program product of claim 12, wherein the program instructions further cause the computer to:

detect that a frequency of entry of a plurality of basic blocks in the trace is greater than or equal to a predefined entry frequency threshold level indicating an end of the trace; and identify the maximum trace size of the program based on a last basic block located at the end of the trace.

17. The computer program product of claim 12, wherein the program instructions further cause the computer to:

determine the garbage collection time for the effective trace size and for the maximum trace size of the program based on a recent garbage collection run of the program corresponding to a given trace size that is within a predefined maximum trace size difference to at least one of the effective trace size or the maximum trace size of the program; and determine a mutator time for the effective trace size and for the maximum trace size of the program based on a recent run of the program corresponding to the given trace size that is within the predefined maximum trace size difference to at least one of the effective trace size or the maximum trace size of the program.

18. The computer program product of claim 12, wherein the program instructions further cause the computer to:

add the garbage collection time for the effective trace size and a mutator time for the effective trace size of the program to generate the first total execution time corresponding to the effective trace size of the program;

add the garbage collection time for the maximum trace size and the mutator time for the maximum trace size of the program to generate the second total execution time corresponding to the maximum trace size of the program.

19. The computer program product of claim 18, wherein the program instructions further cause the computer to:

terminate the trace of the program in response to determining that the first total execution time corresponding to the effective trace size of the program is less than the second total execution time corresponding to the maximum trace size of the program;

utilize the effective trace size as an optimal trace size of the program; and record the garbage collection time and the mutator time for the effective trace size of the program and the garbage collection time and the mutator time for the maximum trace size of the program for future reference.

20. The computer program product of claim 18, wherein the program instructions further cause the computer to:

continue the formation of the trace of the program in response to determining that the first total execution time corresponding to the effective trace size of the program is greater than the second total execution time corresponding to the maximum trace size of the program;

utilize the maximum trace size as an optimal trace size of the program; and compile the trace at the maximum trace size of the program.

* * * * *